United States Patent [19]

Eklöf

[11] 4,361,106

[45] Nov. 30, 1982

[54] SHOCK INDICATING DEVICE

[76] Inventor: Krister Eklöf, Bastugatan 17, Stockholm, Sweden, 117 25

[21] Appl. No.: 245,185

[22] Filed: Mar. 18, 1981

Related U.S. Application Data

[63] Continuation of Ser. No. 92,939, Nov. 9, 1979, abandoned.

[30] Foreign Application Priority Data

Nov. 14, 1978 [SE] Sweden ............................... 7811767

[51] Int. Cl.$^3$ ............................................. G01P 15/03
[52] U.S. Cl. ..................................... 116/203; 73/492;
116/294; 206/459
[58] Field of Search ................... 116/203, 294; 73/492;
200/61.45

[56] References Cited
U.S. PATENT DOCUMENTS 3,373,716  3/1968  Williams .............................. 116/203
4,060,004  11/1977  Scholz et al. ........................ 116/203

Primary Examiner—Daniel M. Yasich
Attorney, Agent, or Firm—Holman & Stern

[57] ABSTRACT

A device is disclosed for providing a non-resettable visual indication of a shock above a predetermined value which is sustained by an object carrying the device, comprising a dome-like housing, at least part of which is transparent; a flange means secured to and extending radially outward from the dome-like housing; a plate-like biasing means secured to the dome-like housing, the plate-like biasing means and the interior surface of the top portion of the dome-like housing being spaced apart and defining a chamber therein; and an indicating body within the chamber positioned between the biasing means and the interior surface of the top portion of the housing. Prior to being subjected to a force above the predetermined value, the indicating body is maintained in a first position and when subjected to a force above the predetermined value is irreversibly released to a second position.

7 Claims, 11 Drawing Figures

SHOCK INDICATING DEVICE

This is a continuation of application Ser. No. 92,939, filed Nov. 9, 1979, now abandoned.

The present invention relates to a device for indicating if items during handling and transportation have been subjected to outer physical influence above a predetermined value.

Specifically, the indicating device comprises a cover or housing attachable to the item or a package containing the item and consisting of a bottom section and a top portion formed as an enlargement from the bottom portion, at least a part of said enlargement being made of transparent material; spring means positioned inside of the outer plane of said bottom portion and spring active towards said part of the enlargement; and an indicating body positioned between said spring means and said part of the enlargement, said body being pressed by said press means against said part of the enlargement with a spring force holding the body in its position between said spring means and said part upon an outer physical influence below said predetermined value but irreversibly releasing the body upon an outer physical influence exceeding said value.

Such an indicating device according to the invention has an advantage in being sensitive to shock forces directed laterally of the housing around the periphery thereof but not to the same extent to shock forces directed perpendicular to the support surface of the indicating body on said spring means. A sheet-shaped packaging material has often insufficient ability to transmit correctly shocks directed perpendicular to the package surface. The package can bend in said direction, so that the acceleration of the indicator is damped. It can also upon a shock in said direction transmit the shock to the indicating device without either the item or the package being damaged. It is accordingly of value, that the spring forces of the indicating device act perpendicular to the packing surface, so that the "dead sector" of the indicating device coincides with the direction in which the packaging material insufficiently transmits shocks.

Moreover, an indicating device according to the invention permits a shallow cover configuration of small size. This is particularly desirable in order to be able to mount the device inserted in for instance thin corrugated cardboard material and at the same time due to the small size only a little hole has to be made, so that the corrugated cardboard is not weakened to the instant undesirable extent.

An indicating device is furthermore so simple and inexpensive as to be a disposable device. It is also well adapted for automatic production.

Further advantages and characteristics of the present invention will be evident from the following description of embodiments of the invention with reference to the accompanying drawings, in which.

Figure 1:
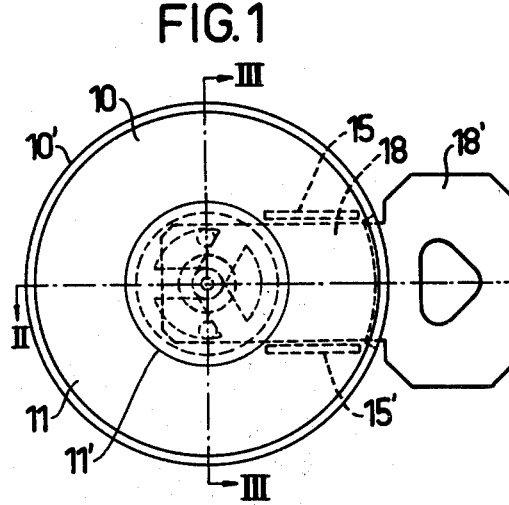
FIG. 1 is a top view of one embodiment of an indicating device.
Figure 2:
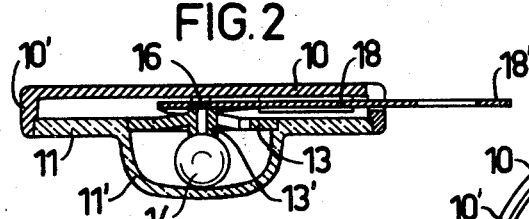
FIG. 2 is a sectional view taken on line II—II of FIG. 1.
Figure 7:
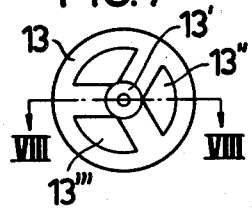
FIG. 7 is a view of a spring means included in the indicating device and arranged for acting on an indicating ball.
Figure 8:
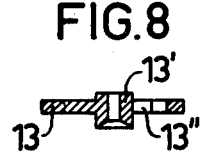
FIG. 8 is a sectional view taken on line VIII—VIII of FIG. 7.

The indicating device shown in FIGS. 1-8 consists of a housing including a bottom portion 10, which comprises a circular plate having an edge flange 10', and a circular top section 11 positioned apart from the inner surface of the circular plate 10 and attached to the free edge portion of the flange 10'. The top section 11 has a central dome-like portion having a central axis, a top portion and a peripheral side well portion, the dome-like portion 11' directed away from the inner surface of the plate 10 and forming therewith a circular space or chamber 12. The whole indicating device or the top section 11 or only the enlargement 11' is transparent. The space 12 is confined by a spring plate 13 acting perpendicular to its extension. The plate 13 is annular and attached to the top section adjacent the enlargement 11'. This spring-action plate 13 is provided with a central support column 13', directed perpendicularly to the plate. The free end of the support column is cupular and provides for a guiding support for a ball 14 abutting the inner surface of the enlargement 11'. The plate 13 has openings 13'', 13''' so that spoke-like arms extend to the support column 13', thereby making the plate 13 spring-active in its perpendicular direction adjacent the column 13 and the cupular end thereof presses against the ball 14 which in turn presses against the inner surface of the enlargement 11'.

The inner surface of the bottom portion 10 is provided with two parallel guides 15, 15' and two pins 16, 16'. The flange 10' of the bottom portion 10 has a recess 17 with an extension substantially equal to the distance between the guides 15, 15'. A thin and elongated slide 18 having a grip 18' is removably and displaceably arranged through the recess 17 and between the guides 15, 15'. In the inserted position the longitudinal edges of the slide rest on the upper surfaces of pins 16, 16' and the central portion of the slide between the pins, presses against the support column 13', so that an additional pressure against the ball is obtained resulting in a locking thereof. Thus, the slide 18 acts in this position as a safety means for hindering the displacement of the ball from the column 13' before the indicating device has been attached to an item or its packing. After the indicating device has been secured in position, the slide is removed, whereby only the pressure from the spring plate 13 acts on the ball 14. After removing the slide it can not again be inserted to its position acting against the column 13', since the pins 16, 16' serve as stop means for moving the slid to said position.

Should an item or a package to which it is secured be subjected to outer influence above a determined value during handling and transportation, for instance an unpermitted high shock, the ball 14 is brought out of its normal central position on the column and can not be brought back to said position, since column 13' is displaced towards the upper inner surface of enlargement 11' by influence of the spring plate 13. Thus, column 13 serves as a blocking means for the ball 14 to be returned to its normal position. If the ball has been removed from its normal position, for instance to the position shown in FIG. 4 by dashed line, this indicates that the item has been subjected to a substantial shock.

Figures 3, 4:
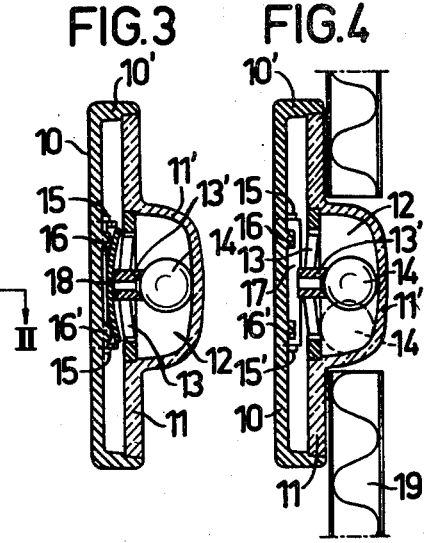
FIG. 3 is a sectional view taken on line III—III of FIG. 1.
FIG. 4 is a sectional view corresponding to that of FIG. 3, illustrating the indicating device attached to a package and adapted for function.
Figure 5:
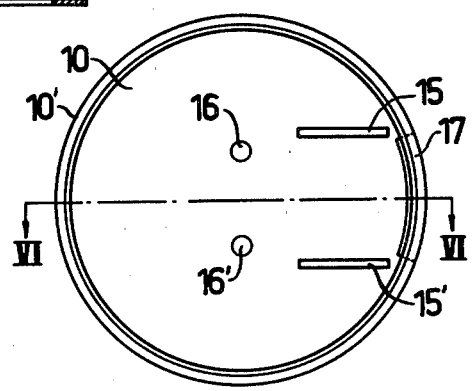
FIG. 5 is a view of a bottom of the indicating device.
Figure 6:
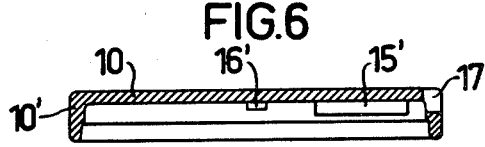
FIG. 6 is a sectional view taken on line VI—VI of FIG. 5.

As shown in FIG. 4, an indicating device is attached to a package, for instance a package of corrugated cardboard material 19. A hole has been made in the package, in which hole the enlargement 11' is fitted. Hereby it is possible to see the position of the ball 14 without opening the package. The indicating device can in this case also be attached to an item within the package.

Figure 9:
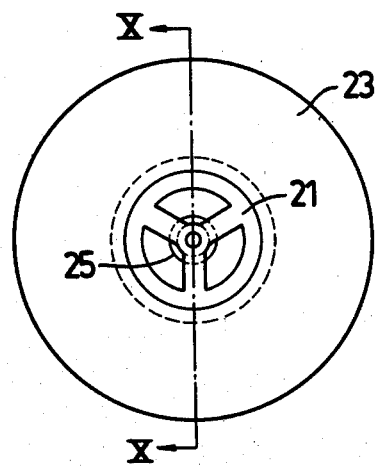
FIG. 9 is a bottom view of another embodiment of an indicating device according to the invention.
Figure 10:
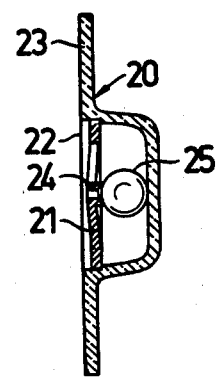
FIG. 10 is a sectional view taken on line X—X of FIG. 9.

FIGS. 9 and 10 show a simplified and preferred embodiment of an indicating device according to the invention. This indicating device consists of a cover or housing 20 corresponding substantially to the top section 11 of the device shown in FIGS. 1–8. The spring plate 21 is almost identical to the spring plate 13, but it is positioned inside the bottom plane 22 of the bottom plate or flange 23 and the column 24 supporting the ball 25 only extends in the direction towards the ball. Unlike column 13' of FIGS. 1–8, the column 24 accordingly has no extension in the direction opposite the ball and no slide in accordance with slide 18 is inserted.

Figure 11:
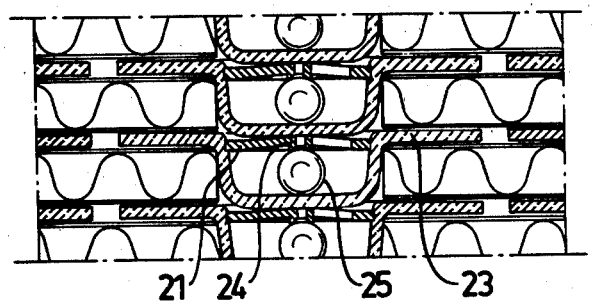
FIG. 11 is a sectional view illustrating indicating devices of FIG. 9 piled above each other in a package.

FIG. 11 illustrates a number of indicating devices of FIGS. 9 and 10 piled above each other in a suitable package such as a closed receptacle for delivering to a user. The indicating devices are positioned such that they are secured against a removal of the ball 25 from its normal position on the column 24. The enlargement of cover 20 in one indicating device presses against the spring plate 21 of above positioned indicating device and thereby provides for an additional pressure of the ball against the enlargement of the above positioned device.

Several indicating devices can be attached to an item or to a package for one or several items.

As an alternative to the embodiments described above and shown on the drawings, the spring plate can be made in one piece with the cover.

I claim:

1. A device for providing a non-resettable, visual indication of a shock above a predetermined value sustained by an object carrying the device, comprising:
   a housing means at least part of which is transparent including:
   a dome-like portion having a central axis, a top portion, at least part of which is transparent, and a peripheral side wall portion;
   a flange means extending radially outward from said side wall portion;
   a plate-like biasing means fixedly secured to said housing and extending inwardly from said peripheral side wall portion and substantially perpendicular to said axis, said biasing means and the top portion of said dome-like portion spaced apart and defining a chamber; and
   an indicating body within said chamber positioned between said biasing means and the top portion of said dome-like portion, said body being normally pressed by said biasing means in a first position in contact with the transparent part of said top portion with a force sufficient to maintain said body in said first position when subjected to a force below said predetermined value but said biasing means irreversibly releasing said body from said first position to a second position spaced therefrom upon being subjected to a shock exceeding said value.

2. A device according to claim 1, wherein said indicating body is a ball and said biasing means includes a support column with a cupular support surface for said ball.

3. A device according to claim 2, wherein said biasing means consists in one piece of an annular plate element, said support column for said ball arranged centrally within said plate element and extending perpendicular to said plate element, and spoke-like arms connecting said plate element to said column.

4. A device according to claim 3, including a bottom plate fixedly secured and in spaced relationship to said flange means, said bottom plate and said flange means defining an aperture therebetween, and a locking means removeably positioned in said aperture and pressing against the surface of said column opposite the cupular support surface, said locking means preventing movement of said column toward said bottom plate before the device is placed in use.

5. A device according to claim 4, including a means for hindering reinsertion of said locking means in said aperture.

6. A package for holding shock indicating devices, said package comprising: a closed receptacle containing a plurality of the devices of claim 1, said indicating devices being placed in contact with one another within said package such that said dome-like portion of one device presses against said biasing means of an adjacent device such that irreversible release of said indicating body is avoided.

7. A package defining a container for an article subject to shock, said package comprising a wall portion including at least one aperture defined therein and at least one indicating device according to claim 1, said flange means of said at least one indicating device being secured to an interior surface of said wall portion of said package and said transparent part of said top portion being viewable through said at least one aperture.

* * * * *